(12) United States Patent
Shah

(10) Patent No.: US 11,543,790 B2
(45) Date of Patent: Jan. 3, 2023

(54) AUTOMATION ENGINEERING FIELD DEVICE WITH MULTIPLE PARAMETER SETS

(71) Applicant: Endress+Hauser SE+Co. KG, Maulburg (DE)

(72) Inventor: Junaid Ali Shah, Steinen (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 48 days.

(21) Appl. No.: 17/262,414

(22) PCT Filed: Jun. 13, 2019

(86) PCT No.: PCT/EP2019/065455
§ 371 (c)(1),
(2) Date: Jan. 22, 2021

(87) PCT Pub. No.: WO2020/025207
PCT Pub. Date: Feb. 6, 2020

(65) Prior Publication Data
US 2021/0294288 A1 Sep. 23, 2021

(30) Foreign Application Priority Data
Jul. 31, 2018 (DE) .......................... 102018118531.6

(51) Int. Cl.
*G05B 19/042* (2006.01)
(52) U.S. Cl.
CPC .. *G05B 19/042* (2013.01); *G05B 2219/25124* (2013.01)

(58) Field of Classification Search
None
See application file for complete search history.

(56) References Cited

U.S. PATENT DOCUMENTS

| 6,095,674 A * | 8/2000 | Verissimo | G05B 19/0426 700/32 |
| 6,411,923 B1 * | 6/2002 | Stewart | G05B 15/02 716/139 |

(Continued)

FOREIGN PATENT DOCUMENTS

| DE | 10250250 A1 | 5/2004 |
| DE | 10356629 A1 | 7/2005 |

(Continued)

*Primary Examiner* — Jason Lin
(74) *Attorney, Agent, or Firm* — Mark A. Logan; Endress+Hauser (USA) Holding, Inc.

(57) ABSTRACT

Disclosed is an automation engineering field device, comprising: a sensor unit for capturing a physical measured variable for a medium; a memory unit, wherein the memory unit stores at least one standard parameter set and further parameter sets; an electronic unit, wherein the electronic unit is configured so as, after the field device starts, to load the standard parameter set and to operate the field device on the basis of the standard parameter set and wherein the electronic unit is configured so as, when a signal is received, to take the configuration of the signal as a basis for loading one of the further parameter sets and to operate the field device, or components of the field device, on the basis of the further parameter set.

5 Claims, 1 Drawing Sheet

(56) References Cited

U.S. PATENT DOCUMENTS

| | | | | |
|---|---|---|---|---|
| 6,490,538 | B1* | 12/2002 | Glombitzs | G01D 5/35383 |
| | | | | 702/123 |
| 7,167,762 | B2* | 1/2007 | Glanzer | G05B 11/01 |
| | | | | 702/182 |
| 7,643,639 | B2* | 1/2010 | Kaszkin | G05B 19/0428 |
| | | | | 713/153 |
| 9,130,853 | B2* | 9/2015 | Smith | H04L 12/2825 |
| 9,141,106 | B2* | 9/2015 | De Groot | G05B 19/0425 |
| 9,274,515 | B2* | 3/2016 | Thakur | G05B 19/042 |
| 9,398,097 | B2* | 7/2016 | Baret | G05B 19/0423 |
| 10,216,152 | B2* | 2/2019 | Keutner | G05B 9/02 |
| 2002/0131454 | A1* | 9/2002 | Franke | H04J 3/0652 |
| | | | | 370/503 |
| 2003/0236579 | A1* | 12/2003 | Hauhia | G05B 19/0428 |
| | | | | 340/506 |
| 2005/0116722 | A1* | 6/2005 | Wolter | G01D 18/00 |
| | | | | 324/601 |
| 2005/0188351 | A1* | 8/2005 | Hoefler | G06F 8/20 |
| | | | | 717/106 |
| 2008/0148296 | A1* | 6/2008 | Chen | G05B 19/4186 |
| | | | | 719/328 |
| 2011/0153078 | A1* | 6/2011 | Kilian | G05B 19/4185 |
| | | | | 700/247 |
| 2012/0004743 | A1* | 1/2012 | Anne | G05B 19/409 |
| | | | | 700/83 |
| 2017/0344751 | A1* | 11/2017 | Brockhaus | G06F 21/629 |
| 2018/0188064 | A1 | 7/2018 | Rivers et al. | |
| 2018/0278628 | A1* | 9/2018 | Kumar Kn | H04W 12/08 |
| 2021/0156714 | A1* | 5/2021 | Flores Delgado | H03M 1/127 |

FOREIGN PATENT DOCUMENTS

| | | | | |
|---|---|---|---|---|
| DE | 102004063776 | A1 | 7/2006 | |
| DE | 102008010864 | A1 | 8/2009 | |
| DE | 102013111690 | A1 * | 5/2015 | G05B 19/0428 |
| DE | 102016120306 | A1 | 4/2018 | |
| EP | 3249478 | A1 | 11/2017 | |
| WO | 2007128544 | A1 | 11/2007 | |
| WO | WO-2007128544 | A1 * | 11/2007 | G05B 19/0428 |

* cited by examiner

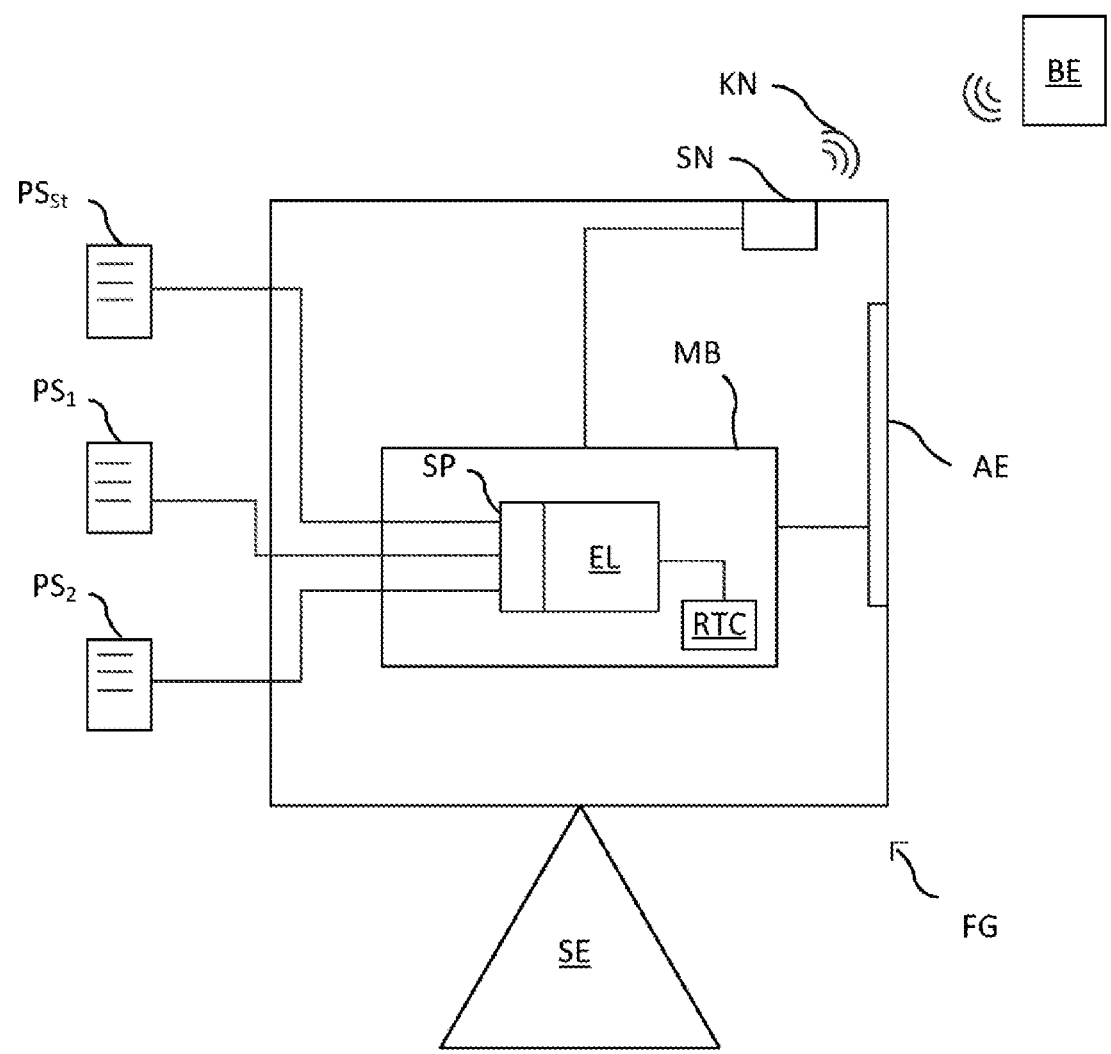

AUTOMATION ENGINEERING FIELD DEVICE WITH MULTIPLE PARAMETER SETS

CROSS-REFERENCE TO RELATED APPLICATIONS

The present application is related to and claims the priority benefit of German Patent Application No. 10 2018 118 531.6, filed on Jul. 31, 2018 and International Patent Application No. PCT/EP2019/065455, filed on Jun. 13, 2019, the entire contents of which are incorporated herein by reference.

TECHNICAL FIELD

The invention relates to an automation engineering field device.

BACKGROUND

Field devices that are used in industrial plants are already known from the prior art. Field devices are often used in process automation as well as in manufacturing automation. Field devices, in general, refer to all devices which are process-oriented and which supply or process process-relevant information. Field devices are thus used for detecting and/or influencing process variables. Measuring devices, or sensors, are used for detecting process variables. These are used, for example, for pressure and temperature measurement, conductivity measurement, flow measurement, pH measurement, fill-level measurement, etc., and detect the corresponding process variables of pressure, temperature, conductivity, pH value, fill-level, flow, etc. Actuators are used for influencing process variables. These are, for example, pumps or valves that can influence the flow of a fluid in a pipe or the fill-level in a tank. In addition to the aforementioned measuring devices and actuators, field devices are also understood to include remote I/O's, radio adapters, or, generally, devices that are arranged at the field level.

A variety of such field devices is produced and marketed by the Endress+Hauser group.

In modern industrial plants, field devices are usually connected to superordinate units via wireless or wired communication networks. The wired communication networks are typically field buses, such as Profibus®, Foundation® Fieldbus, HART®, etc., or modern industrial communication networks or IT communication networks, such as (Industrial) Ethernet. The wireless communication networks are, for example, wireless field buses, such as WirelessHART® etc., or wireless IT communication networks, such as WLAN. Higher-level units are control units, such as an SPS (storage programmable controller) or a PLC (programmable logic controller). The higher-level units are used for, among other things, process control, as well as for commissioning of the field devices. The measured values detected by the field devices—in particular, by sensors—are transmitted via the respective bus system to a (or possibly several) higher-level unit(s) that further process the measured values, as appropriate, and relay them to the control station of the plant. The control station serves for process visualization, process monitoring, and process control via the superordinate units. In addition, a data transfer is also required from the higher-level unit via the bus system to the field devices—in particular, for configuration and parameterization of field devices, as well as for control of actuators.

Field devices sometimes have a large number of parameters, with the aid of which they can be adapted to an application or their functions can be set. In this case, the parameters are divided into static and dynamic parameters. Static parameters represent time-invariant parameters. Dynamic parameters include unmodeled process characteristics entered manually by the customer, such as the tank size of a medium-filled tank.

A so-called parameterization, in which parameter values are assigned to the individual parameters of a field device, is carried out in particular both when commissioning a field device and sometimes within the framework of maintenance of a field device, e.g., during servicing. For this purpose, the field device must be accessed, e.g., by means of an operating unit. This operating unit is generally connected to a service interface, which, in some circumstances, can only be contacted if the housing of the field device is open.

It can often be provided that a user wants to use different parameter settings at different points in time. For example, many properties of process media depend on the temperature so that, for example, the density of a medium located in a tank may change at different times of the day or seasonally. This sometimes also changes limit values, e.g., the maximum and minimum fill level of the medium in the tank. In the field devices customary nowadays, however, it is provided to respectively specify only one parameter value for a parameter of a field device. This parameter value cannot be changed without, as described above, the field device having to be accessed and the parameter value being changed manually. Alternatively, a plant operator must have available several field devices of the same type but with different parameter settings.

SUMMARY

Proceeding from this problem, the invention is based on the object of introducing a field device which allows its parameter settings to be adapted in a simple manner.

The object is achieved by an automation engineering field device comprising:
a sensor unit for detecting a physical measured variable of a medium;
a memory unit, wherein the memory unit stores at least one standard parameter set and further parameter sets;
an electronic unit, wherein the electronic unit is configured, after the field device starts, to load the standard parameter set and to operate the field device on the basis of the standard parameter set, and wherein the electronic unit is configured, when a signal is received, to take the configuration of the signal as a basis for loading one of the further parameter sets and to operate the field device, or components of the field device, on the basis of the further parameter set.

The great advantage of the field device according to the invention is that it is possible to switch between different parameter sets in a simple manner. In connection with the parameter sets, "different" means that a correspondingly different parameter value is assigned to at least one parameter of the field device. The field device does not have to be accessed for this purpose as previously known; the parameter values do not have to be manually entered individually.

It may be provided for the different parameter sets to already be stored on the field device ex works. However, these parameter sets may also be adapted or created when commissioning the field device or may be created or edited during conventional access to the field device. Any number of further parameter sets may also be added later.

The received signal is configured in such a way that it represents, for the electronic unit, unambiguous information as to which of the plurality of parameter sets is addressed.

Examples of components of the field device are, for example, the sensor unit, the electronic unit, a display unit, or an interface for communication with other devices.

Possible applications and measurement principles for such a field device according to the invention have already been mentioned by way of example in the introductory part of the description.

According to an advantageous embodiment of the field device according to the invention, it is provided for the electronic unit to be configured, after loading the further parameter set, when a signal is received, to take the configuration of the signal as a basis for loading one of the further parameter sets or the standard parameter set and to operate the field device on the basis of the further parameter set, or of the standard parameter set. This method can be repeated as often as desired and is not limited to a single application after starting the field device.

According to a preferred embodiment of the field device according to the invention, it is provided for the field device to have an interface for connection to a wireless or wired communication network, wherein the field device is configured to receive the signal via the communication network, in particular transmitted from an operating unit integrated in the communication network.

In case the communication network is a wired network, in particular the Ethernet standard is used. The communication network may also be an automation engineering field bus, e.g., based on one of the protocols HART, Profibus PA/DP, Foundation Fieldbus, etc. It may also be provided for the first communication network to consist of several subsegments which, in some circumstances, are based on different protocols.

The operating unit is, for example, an operating unit in the sense of the Field Xpert manufactured and sold by the applicant. However, the operating unit may also be a computing unit, e.g., a laptop, or a mobile terminal, e.g., a tablet or a smartphone.

Alternatively, it is provided for a wireless communication network to be used as the communication network. This wireless communication network is in particular based on the WLAN or WiFi standard or on the Bluetooth standard. Alternatively, any other conventional wireless standard may be used.

The interface may also be a conventional service interface via which an operating unit can be connected to the field device in a wired manner.

According to an advantageous embodiment of the field device according to the invention, it is provided for the field device to be connected to a further sensor unit or a further field device, in particular via the first interface or via a second interface, wherein the further sensor unit or the further field device detects at least one environmental variable of the field device, in particular a temperature value and/or a brightness value, and, if at least one predetermined limit value is exceeded or undershot, generates a signal assigned to the limit value and transmits it to the electronic unit of the field device. In this way, it is possible for the field device to react directly to environmental changes and to select an adequate parameter set.

According to a preferred embodiment of the field device according to the invention, it is provided for the field device to have a timer, in particular a real-time clock, wherein the timer or the electronic unit is configured to generate, at one or more defined points in time, a signal assigned to the respective point in time. In contrast to a logical clock, for example, which measures a relative time, a real-time clock measures the physical time. After comparison with a reference clock, the field device thereby has the current time, or the current date, at all times. In this way, it can be set, for example, that the field device changes the parameter set daily at a specific time without external communication with the field device having to take place. This makes it possible, for example, for a different parameter set to be used at night than during the day.

According to an advantageous embodiment of the field device according to the invention, it is provided for the parameter data sets to have parameters with regard to the sensor, in particular with regard to the measurement principle and/or with regard to limit values. Settings with regard to warning messages (if the limit values are undershot or exceeded) and diagnostic messages are also included in this point.

According to a preferred embodiment of the field device according to the invention, it is provided for the field device to have a display unit and wherein the parameter data sets comprise parameters with regard to the display unit, in particular with regard to a menu representation on the display unit, a brightness level of the display unit, and/or a display format of information on the display unit. For example, in the evening/at night, or upon detection of a change in the light conditions by means of an external sensor, the brightness of the display can be correspondingly adapted, e.g., increased. The display unit is, for example, a display attached to the field device.

According to an advantageous embodiment of the field device according to the invention, it is provided for the electronic unit to be configured to request an access code when the field device is accessed, wherein a corresponding access code to be requested is defined in each parameter data set and is used when loading the respective parameter data set. Operating access to the field device, or to components of the field device, such as its display, by means of keys in the display or by means of an operating unit is defined as access, for example. In such a case of access, entering the access code is required. If the access code is not entered or if an incorrect code is entered, access is denied.

One possible example for this embodiment is that different access codes are required at different times. For example, the access codes can in this way be adapted to shift times of service employees so that only a corresponding specific access code is permitted during a shift. Corresponding points in time at which the field device changes the parameter set in each case are defined for the respective shift times so that the corresponding access code to be requested is defined for the respective shift in the field device.

BRIEF DESCRIPTION OF THE DRAWING

The invention is explained in greater detail with reference to the following FIGURES. Illustrated are:

FIG. 1 shows an embodiment of the field device according to the present disclosure.

DETAILED DESCRIPTION

An example of a field device FG according to the invention is shown in FIG. 1. The field device is installed at a measuring point of an automation engineering plant and is used to determine a physical measured variable of a process medium. The field device FG has a sensor unit SE for detecting the physical measured variable. Examples of such sensor units SE and possible applications for the field device FG have already been mentioned by way of example in the introductory part of the description.

For converting/further processing the detected measured variable and for controlling the measuring procedure, the field device FG has a main board MB with an electro unit EL, which electronic unit EL is configured, for example, in the form of a microcontroller or an ASIC. The detected measured variable is displayed by the field device FG via a display unit AE, e.g., in the form of an electronic display, and is output via a communication network KN. For connection to the communication network KN, which may be wired or wireless, the field device has an interface SN.

The settings of the field device, or of the components AE, EL, SE, are defined in a parameter set. This parameter set defines a plurality of parameters, wherein each of the parameters defines a function of the field device FG and wherein a parameter value is assigned to each parameter.

When the field device FG is started, a standard parameter set $PS_{St}$ is read from the memory SP of the electronic unit EL, e.g., an EEPROM, and loaded into the electronic unit EL. The field device FG is subsequently operated on the basis of the standard parameter set $PS_{St}$.

In addition to the standard parameter set $PS_{St}$, a plurality of further parameter sets $PS_1$, $PS_2$ are stored in the memory unit. A specific signal is assigned to each of the parameter sets $PS_1$, $PS_2$. If the electronic unit EL receives such a signal, it loads the corresponding parameter set $PS_{St}$, $PS_1$, $PS_2$ and operates the field device from now on with the newly loaded parameter set $PS_{St}$, $PS_1$, $PS_2$.

In principle, the signal can be generated, or transmitted to the electronic unit EL, in three ways:

In a first case, the signal is transmitted via the communication network KN to the field device FG or to its electronic unit EL. The signal is transmitted to the field device FG, for example, from an operating unit BE, which is for example a laptop or a mobile terminal, or from a further network member.

In a second case, the field device FG is connected to a further sensor unit or to a further field device, e.g., via the communication network KN. The further sensor unit, or the further field device, detects an environmental variable of the field device, in particular a temperature value and/or a brightness value. If at least one predetermined limit value is exceeded and/or undershot, the further sensor unit, or the further field device, generates a signal assigned to the limit value and transmits it to the electronic unit EL of the field device FG.

In a third case, the field device comprises a timer, e.g., in the form of a real-time clock RTC. At one or more defined points in time, which comprise a date and/or a time, a signal assigned to the respective point in time is generated.

The field device FG is operated on the basis of the newly loaded parameter set $PS_{St}$, $PS_1$, $PS_2$ until a further signal is received by the electronic unit EL.

Three examples of parameters and a respectively suitable application example are mentioned below:

In a first application, the parameters represent settings for the sensor unit SE. By means of the parameters, a measurement mode of the sensor unit SE as well as limit values for the measurement can be defined. Settings with regard to warning messages (if the limit values are undershot or exceeded) and diagnostic messages are also included in this point. It is, for example, provided for the measuring point to be operated only on workdays. A process medium-filled container to which the field device FG is attached and whose fill level is determined by the sensor unit SE of the field device is not filled and/or emptied on the weekend, for example. At the beginning of the weekend, a signal is generated by the timer, whereupon the field device FG is operated on the basis of a newly loaded parameter set $PS_{St}$, $PS_1$, $PS_2$. This parameter set determines that the measuring rate is set low so that a large time interval results between two measuring time points, whereby energy is saved. At the beginning of a new week, the timer RTC outputs a corresponding signal, whereupon a new parameter set $PS_{St}$, $PS_1$, $PS_2$ is loaded, which defines a comparatively high measuring rate.

In a second application, the parameters represent settings for the display unit AE, in particular with regard to a menu representation on the display unit, a brightness level of the display unit, and/or a display format of information on the display unit. For example, in the evening/at night, or upon detection of a change in the light conditions by means of an external sensor, the brightness of the display can be correspondingly adapted, e.g., increased.

In a third application, the parameters represent security settings and define, for example, an access code which is requested when the field device FG is accessed. Operating access to the field device FG, or to components of the field device FG, is defined as access, for example. In such a case of access, entering the access code is required. If the access code is not entered or if an incorrect code is entered, access is denied. The change of the access code via the parameter set $PS_{St}$, $PS_1$, $PS_2$ can be coupled to the shift times of the service personnel.

It goes without saying that the invention is not restricted to the described applications and makes possible a plurality of further applications. In reality, a plurality of further parameters is also present which can be contained in the parameter sets $PS_{St}$, $PS_1$, $PS_2$.

The invention claimed is:
1. A field device of automation engineering, comprising:
    a sensor unit for detecting a physical measured variable of a medium;
    a memory unit, wherein at least one standard parameter set and a first further parameter set are stored in the memory unit, wherein each of the parameter sets contains application-specific or field device-specific information, and wherein the standard parameter set operates the sensor unit at a first measuring rate and the at first further parameter set operates the sensor unit at a second measuring rate lower than the first measuring rate;
    a real-time clock configured to generate a signal at one or more defined points in time;
    an electronic unit configured to:
        load the standard parameter set after the field device starts;
        operate the field device on the basis of the standard parameter set;
        receive a first signal from the real-time clock and take a configuration of the first signal as a basis for loading the first further parameter set;
        operate the field device, or components of the field device, on the basis of the loaded first further parameter set;
        receive a second signal from the real-time clock and take the configuration of the second signal as a basis for loading the standard parameter set;

wherein the real-time clock is further configured to generate the first signal at first point in time to trigger the electronic unit to load the first further parameter set and thereby operate the sensor unit at the second measuring rate and to generate the second signal at a second point in time after the first point in time to trigger the electronic unit to load the standard parameter set and thereby operate the sensor unit at the first measuring rate.

2. The field device according to claim 1, further comprising:
an interface for connection to a wireless or wired communication network, wherein the field device is configured to receive the signal via the communication network.

3. The field device according to claim 1, wherein the parameter sets have parameters with regard to the sensor unit, including with regard to the measurement principle and/or with regard to limit values.

4. The field device according to claim 1, further comprising:
a display unit, wherein the parameter sets include parameters with regard to the display unit, including with regard to a menu representation on the display unit, a brightness level of the display unit, and/or a display format of information on the display unit.

5. The field device according to claim 1,
wherein the electronic unit is further configured to request an access code when the field device is accessed,
wherein a second further parameter set is stored in the memory unit and the second further parameter set contains application-specific or field device-specific information,
wherein the standard parameter set includes a first access code and the second further parameter set includes a second access code different from the first access code,
wherein the real-time clock is further configured to generate a third signal at third point in time to trigger the electronic unit to load the second further parameter set and thereby change an access code in the field device to the second access code, and
wherein the real-time clock is further configured to generate a fourth signal at a fourth point in time to trigger the electronic unit to load the standard parameter set and thereby change the access code within the field device to the first access code.

* * * * *